May 3, 1960 M. J. W. GEENEN ET AL 2,934,945

MACHINE FOR BENDING SPECIMEN

Filed Sept. 14, 1956

INVENTORS
MATHEUS JOSEPHUS WILHELMUS GEENEN
GERARDUS OTTEN

BY *[signature]*

AGENT

United States Patent Office 2,934,945
Patented May 3, 1960

2,934,945
MACHINE FOR BENDING SPECIMEN

Matheus Josephus Wilhelmus Geenen and Gerardus Otten, Eindhoven, Netherlands, assignors, by mesne assignments, to North American Philips Company, Inc., New York, N.Y., a corporation of Delaware Application September 14, 1956, Serial No. 609,908

Claims priority, application Netherlands September 22, 1955

5 Claims. (Cl. 73—100)

This invention relates to a bending machine and particularly to a testing machine for bending test strips of metal through a specified angle and with a specified radius of bend.

A requirement frequently imposed by a user of metal is that a specimen having a certain form should not crack or break when bent through a prescribed angle around a mandrel of a prescribed diameter. The result of a bending test, however, depends upon the manner in which the test is carried out and it is the primary object of the present invention to provide a uniform bend-testing machine which will subject test samples to substantially pure bending forces with a controlled radius of bend and with any desired angle of bend up to 180°.

The machine for carrying out this object, together with ancillary objects, will be further described in the following specification and with reference to the drawing in which.

The basic principle on which the invention operates is that a strip of metal to be tested is clamped to a mandrel having an edge rounded to the desired test radius. That part of the metal specimen which extends beyond the mandrel is then folded over the rounded edge, the radius of which determines the radius of the bend. The angle through which the free end of the test specimen is pushed determines the angle of the bend. In order to reduce shearing forces on the specimen as much as possible, the thrusting block which pushes the free end through the prescribed angle may be provided with rollers which bear upon the test specimen and roll freely across its surface without tending to tear the metal.

Figure 1:
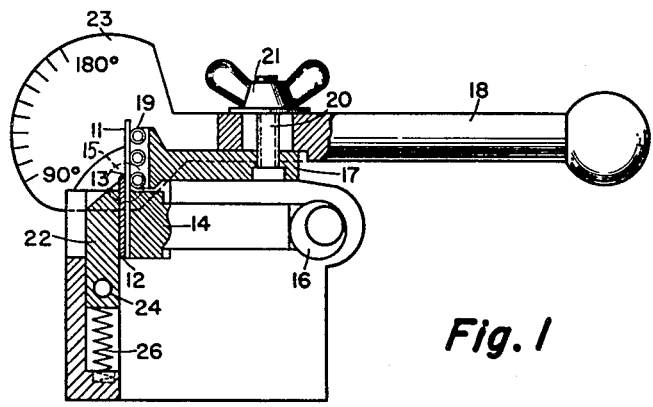
Fig. 1 shows one embodiment of the testing machine set up with a sample to be bent.

Referring now to Fig. 1 for a more complete description of the invention, the test specimen is indicated by reference character 11 and is held in place against a mandrel 12 the upper edge 13 of which is rounded to the prescribed test radius. A clamp for holding the test specimen in place consists of a plunger 14 operated by an eccentric cam 16 which is rotated about its axis by a handle (not shown). The face of the plunger 14 which engages the test specimen 11 is shaped in such a way as to support the specimen as close as possible to the edge 13 of the mandrel in order to prevent unwanted deformation of the specimen and to reinforce the edge 13 when the angle of bend exceeds 90°.

The bending of the specimen 11 is effected by a thrust block 17 which is moved by a lever 18. The only contact between the specimen and the thrust block is through three rollers 19 mounted on the face of the thrust block. These rollers insure that the force applied to the specimen 11 will be substantially frictionless so as to exert practically no tensile load which would tend to shear off the specimen against the edge 13 of the mandrel. This is important for if there were any appreciable tensile load on the specimen it would not be subjected to a pure bend and premature cracking might occur.

It is also important for the rollers 19 to apply pressure to specimen 11 as close to the rounded edge of the mandrel 12 as possible in order that the specimen be bent to conform to the radius of the rounded edge, while leaving sufficient space to allow the thrust block 17 and the rollers 19 to clear the specimen as the rollers pass across the top of the mandrel 12. In order to apply the proper pressure to the specimen, the lever 18 preferably is pivoted about a center concentric with the center of radius of the edge 13 at pivot point 15, and the axis of the lowest of the three rollers 19 is in the same horizontal plane as the pivot axis of the lever 18. This is desirable for the correct functioning of the machine, and in order to insure this correlation between centers each interchangeable mandrel 12 is ground in such a way that no matter what the radius of curvature of its edge 13 may be, the center of this curvature always lies in substantially the same position when the mandrel is inserted in the machine. Thus, since the center of rotation of lever 18 exactly coincides with the edge 13 and the center line of the lowermost roller 19 extends in the same plane as the center of rotation of lever 18, the thrust exerted on the testing specimen will invariably act in line with the radius of curvature of the edge 13. This construction affords the advantage that practically any undue tensile stress, shearing stress and shock loads are avoided. Furthermore, it is desirable to provide for testing specimens of different thicknesses. Such a variation of thickness is accommodated by shifting the position of the thrust block 17 with relation to the lever 18 and this shift of position in turn is provided for by attaching the thrust block to the lever by means of a bolt 20 passing through a slotted hole in the lever 18 and being secured in place by a wing nut 21.

A slidable support bar 22 is located directly in front of the mandrel 12 to take up the horizontal component of the force exerted upon the mandrel during the bending operation so as to prevent the mandrel from being bent itself under the strain. When the angle of bend exceeds 90°, this horizontal force component reverses direction and the clamp plunger 14 then takes up the horizontal force. Beyond the 90° bend point the support bar 22 is no longer necessary and indeed forms an obstruction to further bending. For this reason, it is pressed downward by means of a cam, or preferably two cams, 23 located on either side of the test specimen 11 and shaped so that, when the angle of bend becomes greater than 90°, the cams 23 engage the ends of a pin 24 projecting from the support bar 22.

Figure 2:
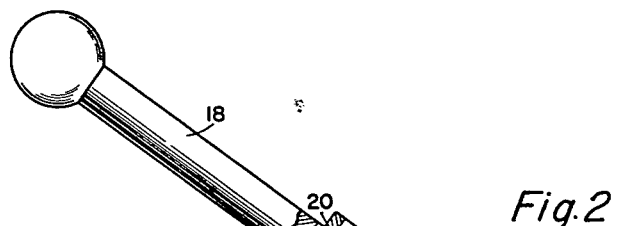
Fig. 2 shows the machine of Fig. 1 after it has been operated so as to bend the sample through an angle of 145°.
Figure 3:
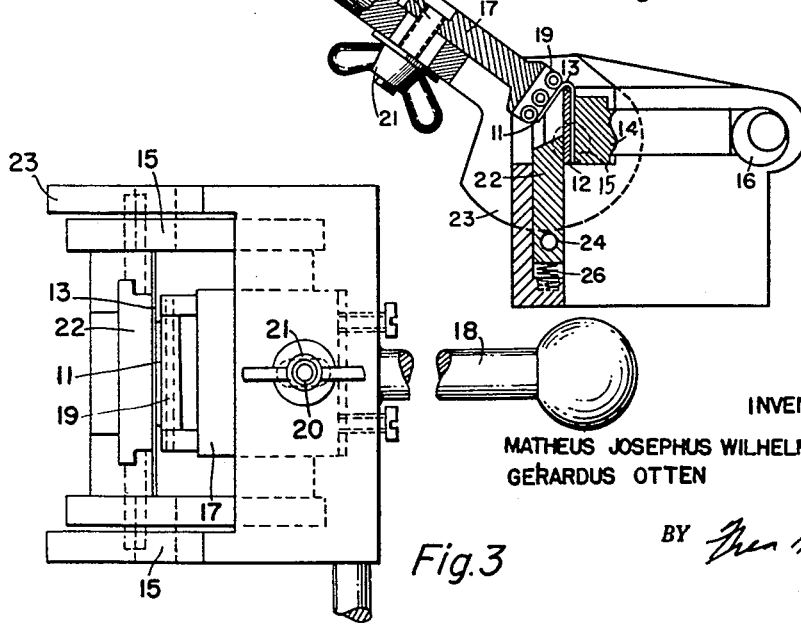
Fig. 3 shows a plan view of the machine of Fig. 1.

Fig. 2 shows the result of engagement between cam 23 and the pin 24 when the angle of bend is 145°. It may be seen that the bar 22 has been pushed downward against the action of a spring 26 so as to be completely out of the way of the end of the test specimen 11, which may then be bent through the remaining 35° until it is directly against the side of the mandrel 12. The angle of bend may be determined by a calibrated scale which may conveniently be inscribed on, or applied to the cam 23; and, because the thrust block 17 swings out of the way as the bending process proceeds, the surface of the specimen may be closely examined to determine the exact angle at which cracks start to appear.

Although the invention has been described in terms of a single embodiment and particularly in terms of a machine for bending strips of metal specimens, modifications will readily occur to those in the art, and particularly, but not exclusively, modifications to allow the machine to be used for bending metal in wire, bar, or tubular form. It is our desire, therefore, that the scope of the invention be measured by the following claims.

What is claimed is:

1. A mechine for bending specimens, said machine comprising: a mandrel having a projecting rounded edge over which the specimens are to be bent; clamping means to clamp a specimen to the mandrel with a portion of the specimen extending beyond said rounded edge; a thrust block; substantially frictionless bearing means on the face of said thrust block to exert bending pressure on the portion of the specimen extending beyond said rounded edge, means pivoting said thrust block about an axis substantially concentric with said rounded edge to bend the specimen over the rounded edge; and a slidable support bar located on the side of said mandrel distal from the initial position of said thrust block to reinforce said mandrel during the bending operation, said support bar being slidable to retract from said rounded edge after the specimen has been bent through an angle of substantially 90°.

2. A machine for bending specimens, said machine comprising: a mandrel having a rounded edge over which the specimens are to be bent; clamping means to clamp a specimen to the mandrel with a portion of the specimen extending beyond the rounded edge; a thrust block; substantially frictionless bearing means on the face of said block to exert bending pressure on the portion of the specimen extending beyond said rounded edge, means pivoting said thrust block about an axis substantially concentric with said rounded edge to fold the specimens over the rounded edge; a slidable support bar located on the side of said mandrel distal from the initial position of said thrust block; and cam means attached to said thrust block to push said support bar away from said rounded edge after said specimen has been bent through an angle of approximately 90°.

3. The machine of claim 2 in which said cam means includes a calibrated scale to indicate the angle through which said specimen has been bent.

4. A machine for bending specimens, said machine comprising: a mandrel having a rounded edge over which the specimens are to be bent; clamping means to clamp a specimen to the mandrel with a portion of the specimen extending beyond the rounded edge; a thrust block; substantially frictionless bearing means on the face of said block to exert bending pressure on the portion of the specimen extending beyond said rounded edge; a lever means pivoting said lever about an axis substantially concentric with said rounded edge, said thrust block being attached to said lever to bend the specimens over the rounded edge, said thrust block being slidable with respect to said pivoting axis to accommodate specimens of different thickness; a slidable support bar located on the side of said mandrel distal from the initial position of said thrust block; and cam means attached to said lever to push said support bar away from said rounded edge after said specimen has been bent through an angle of approximately 90°.

5. A machine for bending specimens, said machine comprising: a mandrel having a rounded edge over which the specimens are to be bent; clamping means to clamp a specimen to the mandrel with a position of the specimen extending beyond the rounded edge; a thrust block; a plurality of substantially frictionless roller bearings on the face of said block to exert bending pressure on the portion of the specimen extending beyond said rounded edge; the axis of the one of said roller bearings closest to said mandrel being in substantially the same horizontal plane as the axis of curvature of said rounded edge so that said one of said roller bearings can roll over the specimen while exerting only bending pressure thereon; a lever, means pivoting said lever about an axis substantially concentric with said rounded edge, said thrust block being attached to said lever to bend the specimens over the rounded edge, said thrust block being slidable with respect to said pivoting axis to accommodate specimens of different thickness; a slidable support bar located on the side of said mandrel distal from the initial position of said thrust block; and cam means attached to said lever to push said support bar away from said rounded edge after said specimen has been bent through an angle of approximately 90°.

References Cited in the file of this patent

UNITED STATES PATENTS 2,528,918    Stanius _____ Nov. 7, 1950

FOREIGN PATENTS 185,253    Great Britain _____ Sept. 7, 1922
730,815    Germany _____ Dec. 12, 1939